United States Patent [19]
Cheu

[11] Patent Number: 6,042,966
[45] Date of Patent: Mar. 28, 2000

[54] BATTERY TERMINAL INSULATION

[75] Inventor: S. Scot Cheu, San Jose, Calif.

[73] Assignee: Valence Technology, Inc., Henderson, Nev.

[21] Appl. No.: 09/008,889

[22] Filed: Jan. 20, 1998

[51] Int. Cl.[7] .................................................... H01M 2/02
[52] U.S. Cl. .......................... 429/163; 429/211; 29/623.1
[58] Field of Search ..................................... 429/162, 163, 429/211, 100, 127; 29/623.1

[56] References Cited

U.S. PATENT DOCUMENTS

| | | | |
|---|---|---|---|
| 4,092,464 | 5/1978 | Dey et al. | 429/127 |
| 5,591,540 | 1/1997 | Louie et al. | 429/163 |

*Primary Examiner*—Maria Nuzzolillo
*Assistant Examiner*—Susy Tsang

*Attorney, Agent, or Firm*—Young & Basile, P.C.

[57] ABSTRACT

The subject invention provides a battery pouch or container which is highly resistant to shorting. This electrical protection is produced by a folding of the packaging laminate such that the cut edge of the laminate is physically removed and electrically protected from the electrode tab which protrudes from the battery pouch. In one embodiment, the cut edge of the film is folded away from the electrode tab. In a preferred embodiment, the laminar packaging material includes a convex flap of material where the electrode traverses the package. The convex flap is folded away from the electrode tab without wrinkling or distorting the pouch shape. In an alternate embodiment, an intervening layer of insulative material is placed between the cut edge and the electrode tab.

7 Claims, 3 Drawing Sheets

BATTERY TERMINAL INSULATION

TECHNICAL FIELD

The present invention relates to the manufacture of packaged battery assemblies, and more specifically to packaging for laminar lithium ion batteries. An improved laminate packaging is disclosed.

BACKGROUND OF THE INVENTION

Polymer matrix lithium ion cells are the newest of the commercially available battery cells. During the production of these cells, an electrolyte salt solution (electrolyte salt and electrolyte solvent) is imbibed into a polymeric matrix structure to yield a functional, "activated" battery system. Because the battery structure is defined by a polymer matrix, the electrolyte salt solution permeates the entire battery structure. Liquid electrolyte also commonly extends beyond the borders of the battery, filling or partially filling the battery packaging. It is common to use a heat-sealable laminate as the packaging material.

Lithium ion battery packaging may be plastically formed, or may be pouched. Both formed and pouched packaging structures are generally heat-sealed. A pouched structure is shown in FIG. 1. A laminated polymer matrix battery structure 110 is enclosed between heat-sealed laminated layers 112a, b which form a pouch. The pouch is sealed around electrode tabs 114 while permitting the tabs 114 to extend from the otherwise-enclosed pouch. This permits electrical contact to, and use of, the battery via the electrode tabs 114. As noted previously, electrolyte 116 may also be found within the pouch.

Battery packaging materials will vary with the battery manufacturer and the specific application. However, a typical packaging laminate, 212a, b, of the prior art is shown in FIG. 2. This represents a laminate layer 212a, b on each side of a metal foil layer 220, such as that taken at line a—a of FIG. 1. This shows two layers of laminate, 112a and 112b, which have been heat-sealed to enclose the battery pouch while permitting the electrode tab 214 to extend past the borders of the pouch.

The laminate material 212a, b includes a foil layer 220. The foil layer is located generally centrally within the laminate. At one surface of the foil layer is the inner laminar region 213. At the opposite surface of the foil layer is an outer laminar strata 222. The outer laminar strata 222 is provided as a package electrical insulator, for physical package protection, and for package marking or labeling.

The foil layer 220 acts as a barrier to oxygen and moisture incursion into the battery package. The foil also provides rigidity to the package, and provides structural support if the package is pre-formed into a specific shape. However, metal foil 220 can be reactive with lithium ions ($Li^+$) of the electrolyte. An inner strata 213, designed to be nonreactive with the electrolyte, is provided between the foil layer and the package. The inner laminar region 213 should be inert to the enclosed electrolyte salt solution during battery storage and during battery use.

An inner laminar region 213 is positioned between the metal foil and the inside of the package. The inner laminar region has several functions. It provides a physical barrier between the metal foil and the electrolyte salt solution. Upon sealing, it provides a nonconductive barrier between the metal foil and the electrode tabs, which preliminarily prevents package shorting. It aids in plastic formation of the package, and it provides a self-sealing bond. Two layers of the package laminate can be placed with the inner laminar layers abutting each other. When an appropriate heat and pressure are applied, a heat-seal bond is produced.

The inner laminar region 213 generally includes a layer of polyamide 224 such as a nylon, and a heat-fusible sealing layer 226. Other layers which may be present but which are not pictured include tie layers (which act to adhere layers in position), or layers which promote formation or duration of the laminate material or of the pouch.

The polyamide layer 224 is located between the metal foil layer 220 and the heat-sealable layer 226. The polyamide layer acts as an insulative layer, keeping the body of the battery electrode tab electrically isolated from the body of the metal foil layer. This separation of the electrode tab and the package foil layers avoids electrical shorts between the body of the battery tab(s) and the body of the laminar package.

SUMMARY OF THE INVENTION

Unfortunately, pouch materials are generally produced by cutting the material to size, either before or after the pouch has been formed by heat-sealing or other mechanical or chemical processes. This cutting process leaves an exposed cut edge 211 of the laminar material. The electrode tab 214 is directly adjacent the cut edge 211, including the metal layer 220. It is very easy for extraneous debris to cause a short between the metal layer 220 and the electrode tab 214.

A short can also occur between the battery and the packaging if the cut edge 211 of the laminate curls toward the electrode tab 214. Touching of the metal layer of the laminate (which is exposed at the cut edge 211) to the electrode tabs 214 can cause a battery short. The potential for shorting between the cut edge of the battery package and the enclosed battery package was not recognized or addressed by the prior art.

The subject invention provides a battery pouch or container, produced from a laminar sheet, which is highly resistant to shorting. This electrical protection is produced by a folding of the packaging laminate such that the cut edge of the laminate is physically removed and protected from the electrode tab which protrudes from the battery pouch. In one embodiment, the cut edge of the film is folded away from the electrode tabs. This folding provides insulative layers of the laminate, rather than a cut edge, adjacent each the electrode tab. In a preferred embodiment, the laminar packaging material includes a convex flap of material where the electrode traverses the package. The convex flap is folded away from the electrode tab without g or distorting the pouch shape.

In an alternate embodiment, an intervening layer of insulative material is placed between the cut edge and the electrode tab. Conveniently, the layer of insulative material is an electrically nonconductive tape which occludes the cut edge of the pouch laminate at the electrode tab, or which covers the electrode tab adjacent the cut edge.

Figure 1:
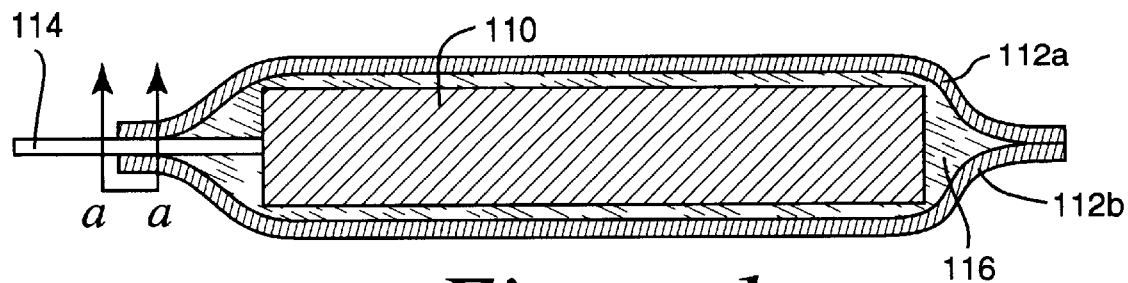
FIG. 1 shows a cross-sectional view of a battery pouch package of the prior art.
Figure 2:
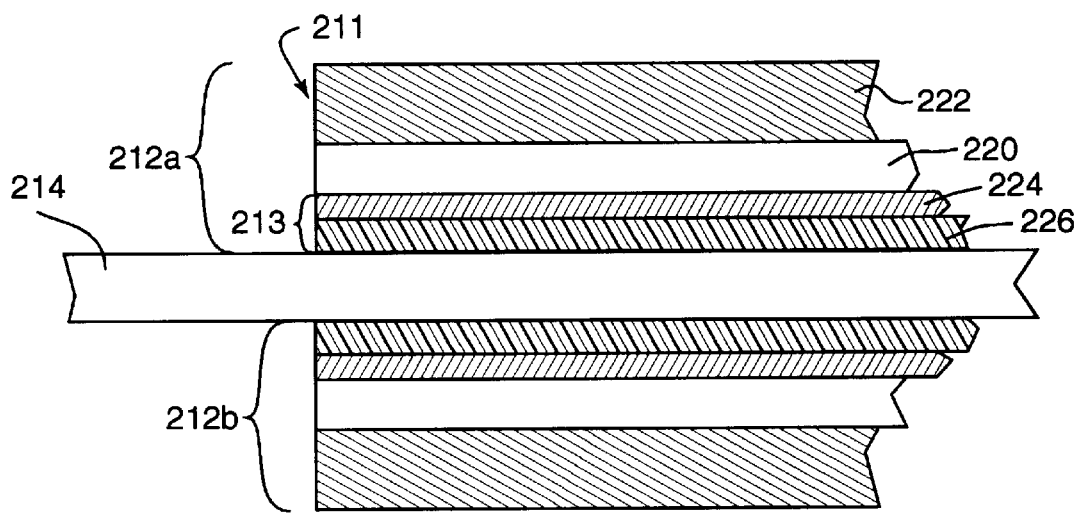
FIG. 2 shows a cross-sectional view of a battery pouch taken through line a—a of FIG. 1.

The figures herein are for illustrative purposes only. They are graphic representations, and are not drawn to scale.

DETAILED DESCRIPTION OF THE INVENTION

A typical laminar lithium ion cell battery includes an anode of a lithium insertion compound; a separator structure or electrolyte film layer; a cathode including electrochemical active material; and an electrolyte prepared from an electrolyte salt and a solvent, such as an inorganic lithium salt dissolved in an organic solvent. Each of the solid battery components is defined by a polymeric matrix structure. Such batteries are well-known in the art and examples of such are set forth in U.S. Pat. Nos. 4,997,732; 4,207,389; and 5,456,000.

The laminar lithium ion cells include at least one, and generally at least two, electrode tabs extending from the battery, through the packaging, and extending outside the packaging. The electrode tabs provide a route for charging and discharging the packaged battery. Electrode tabs are well known to the art.

A typical laminate sheet has two faces and four edges. Each of the faces is formed by, and parallel to the axis of, the laminar strata. The "outer face" is generally protective, insulative, and may have commercial or manufacturing data printed on it. The outer face is that which is exposed when the laminate sheet has been formed into a battery package or pouch. The outer face is defined by the outermost surface of the outer laminar strata. The "inner face" is generally insulative, and is processable using heat, mechanical, or other means to seal the package or pouch. The inner face provides the inner surface(s) of the battery package, nearest the enclosed battery. The inner face is defined by the innermost surface of the inner insulative region.

Located between the strata forming the inner face and the outer face is a metal foil. The foil layer acts as a barrier to oxygen and moisture incursion into the battery package. The foil also provides rigidity to the package, and provides structural support if the package is pre-formed into a specific shape. The foil layer is generally flexible, and/or moldable by press-molding. Appropriate foils include "soft" metals such as small-grained aluminum foils, as known to the packaging art. While this metal layer is resistant to degradation by lithium in the electrolyte, it is capable of shorting out the battery if it comes in contact with the electrode tabs.

The "edges" (of which there are typically four, but the number can be varied as desired) are generally perpendicular to the two faces. The edges can be formed by cutting of a larger sheet, by manufacture during the manufacture of the laminate, or by similar processes. Edges run perpendicular to the axis of the laminar strata, and define the perimeter of the strata. A "cut edge", as the term is used herein, is one in which at least part of the perimeter of each of the inner laminar region and the metal foil layer are exposed. A cut edge can conveniently be produced by cutting, but may also be produced as an edge in manufacturing or construction of the laminate a variety of physical means.

The invention herein provides a means and a method for separating the cut edge of the battery package from the electrode tab(s), using both physical and electrical separation.

Figure 3:
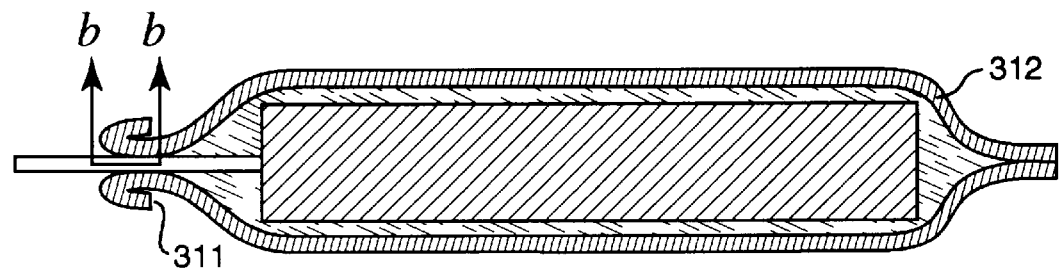
FIG. 3 shows a cross-sectional view of a battery pouch of the subject invention having edges folded at the electrode tab.

In a first embodiment of the invention herein, shown in FIG. 3, the laminar packaging material 312 is folded near the periphery. This fold moves the cut edge 311 so that it is no longer adjacent the electrode tab 314. Rather, the laminate 312 is doubled back upon itself.

Figure 4:
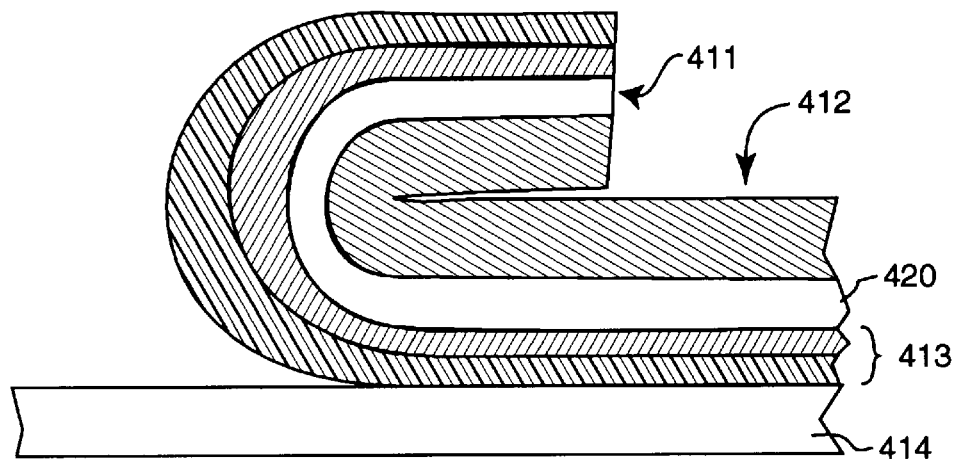
FIG. 4 shows a cross-sectional view of a battery pouch of the subject invention, taken through line b—b of FIG. 3.

FIG. 4 shows a cross-section of FIG. 3, taken through line b—b. The electrode tab 414 extends between two laminar sheets 412 (only one of which is shown) that form the battery pouch. The cut edge 411 of the laminar sheet 412 is folded to double back, parallel to the general axis of the pouch material. The folded inner laminar region 413 shapes to protect the foil layer 420 and the cut edge 411 of the laminar sheet 412 from the electrode tab 414. This fold both places insulative material between the cut edge 411 and the electrode tab 414, and positions the cut edge 411 away from the electrode tab 414.

Figure 5A:
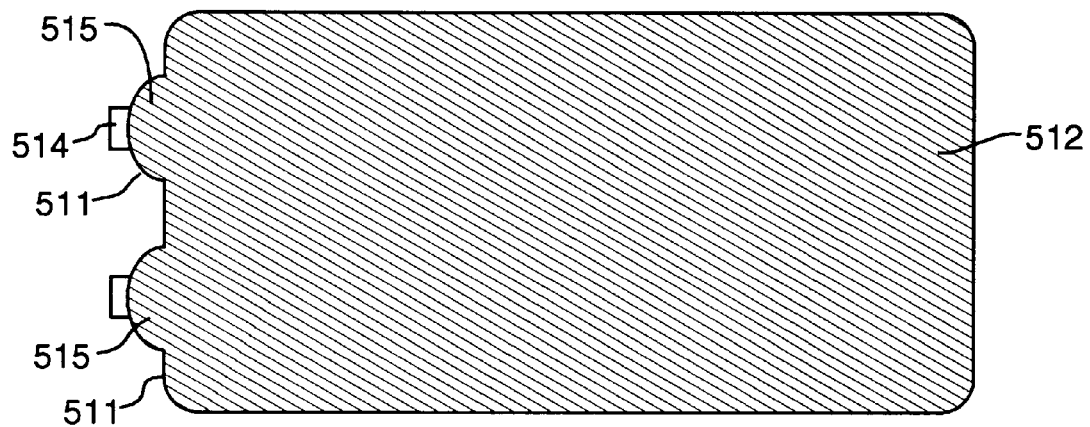
FIG. 5a shows a top view of a battery pouch having a convex overhang at each electrode tab.

FIG. 5a shows a preferred pouch precursor, in which a convex flap 515 or edge is formed in the laminar pouch material 512 adjacent the electrode tab 514. The cut edge 511 extends along the periphery of the entire pouch.

Figure 5B:
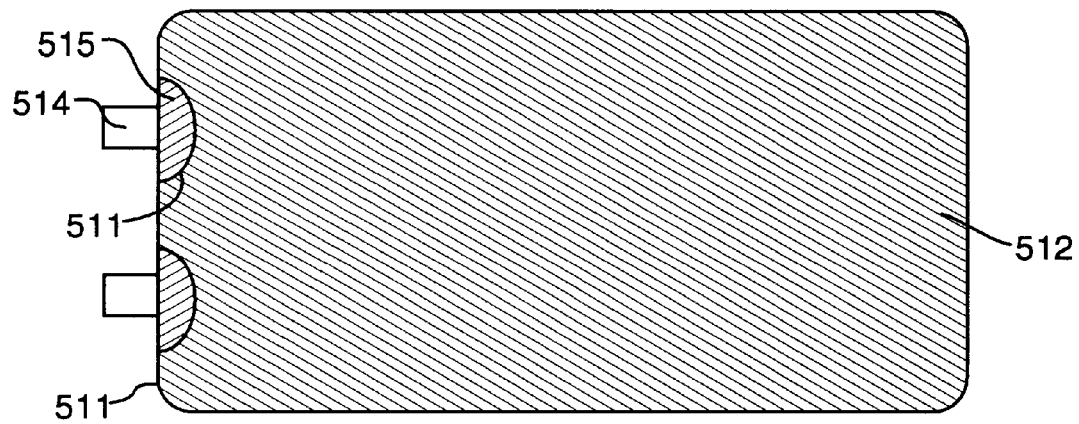
FIG. 5b shows a top view of a battery pouch of FIG. 5a in which the convex overhangs have been folded back to remove the cut edges from the electrode tabs.

FIG. 5b shows the pouch of FIG. 5a in which each convex flap 515 has been folded back over the body of the pouch material 512. The pouch does not have a cut edge 511 proximal to the electrode tabs 514. This embodiment is preferred because the folding of the convex edges is less likely to stress the pouch seals than can the folding of a straight edge.

Figure 6:
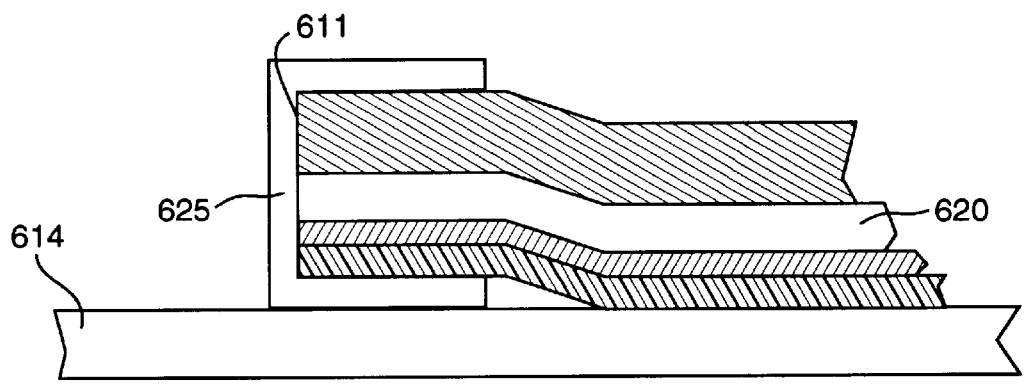
FIG. 6 shows an alternate cross-sectional view of a battery pouch of the subject invention which employs an electrically non-conductive material to occlude the cut edge of the pouch laminate.

An alternate embodiment is shown in FIG. 6. An insulative material 625 such as an insulative tape or a pre-formed capping structure is placed to occlude the cut edge 611. The insulative material 625 acts to physically and electrically isolate the metal foil layer 620 from the electrode tabs 614.

Another embodiment (not shown) uses insulative tape which is placed directly on the electrode tab, interposed between the electrode tab and the cut edge.

While the invention has been described in connection with several exemplary embodiments, it will be understood that many modifications will be apparent to those of ordinary skill in the art in light of the above disclosure. Reference to the following claims should be made to determine the scope of the claimed invention.

I claim:

1. A method for preparing a pouch which is useful for battery packaging, said method comprising:
   (a) providing a battery having at least one electrode tab protruding therefrom;
   (b) forming a pouch to enclose said battery and partially enclosing said electrode tab; said pouch being formed from a laminar pouch material including a central metal foil, said laminar pouch material including at least one cut edge;
   (c) providing a means for separating said cut edge from said electrode tab, wherein said means for separating said cut edge from said electrode tab comprises folding a section of the laminar pouch to physically separate the cut edge from the electrode tab.

2. A method for preparing a pouch which is useful for battery packaging, said method comprising:
   (a) providing a battery having at least one electrode tab protruding therefrom;
   (b) forming a pouch to enclose said battery and partially enclosing said electrode tab; said pouch being formed from a laminar pouch material including a central metal foil, said laminar pouch material including at least one cut edge exposing said central metal foil;

(c) providing a means for separating said exposed central metal foil of said cut edge from said electrode tab, wherein said means for separating said exposed central metal foil of said cut edge from said electrode tab comprises providing an electrically insulative material disposed between the electrode tab and said cut edge of said exposed central metal foil of said pouch material adjacent the cut edge of the laminar pouch.

3. A battery package, said package comprising:

(a) a battery having at least one electrode tab protruding therefrom;

(b) a pouch which encloses said battery, and which partially encloses said electrode tab, said pouch being formed from laminar pouch material including a central metal foil; said laminar pouch material having a cut edge proximal to said electrode tab;

(c) a means for separating said cut edge from said electrode tab, wherein said means for separating said cut edge from said electrode tab is an intervening tape constructed from nonconductive material, the tape covering the cut edge of the laminar pouch adjacent the electrode tab.

4. A battery package, said package comprising:

(a) a battery having at least one electrode tab protruding therefrom;

(b) a pouch which encloses said battery, and which partially encloses said electrode tab, said pouch being formed from laminar pouch material including a central metal foil; said laminar pouch material having a cut edge exposing said central metal foil proximal to said electrode tab;

(c) a means for separating said cut edge exposing said central metal foil from said electrode tab wherein said means for separating said cut edge from said electrode tab is an intervening tape constructed from nonconductive material, said tape adhered to the electrode tab and interposed between the tab and the pouch material adjacent the cut edge of the laminar pouch in a manner sufficient to prevent contact between said electrode tab and said central metal foil.

5. A battery package, said package comprising:

(a) a battery having at least one electrode tab protruding therefrom;

(b) a pouch which encloses said battery, and which partially encloses said electrode tab, said pouch being formed from laminar pouch material including a central metal foil; said laminar pouch material having a cut edge proximal to said electrode tab;

(c) a means for separating said cut edge from said electrode tab;

(d) wherein said means for separating said laminar pouch edge from said electrode tab comprises a fold in the laminar material such that the edge of the material is oriented to be distal to the electrode tab.

6. A battery package of claim 5 wherein a convex edge is present in the laminar material adjacent the cut edge, and said convex edge is folded back to remove the cut edge from the electrode tab.

7. A battery package, said package comprising:

(a) a battery having at least one electrode tab protruding therefrom;

(b) a pouch which encloses said battery, and which partially encloses said electrode tab, said pouch being formed from laminar pouch material including a central metal foil; said laminar pouch material having a cut edge proximal to said electrode tab, said central metal foil being exposed at said cut edge;

(c) a means for separating said cut edge from said electrode tab comprising a nonconductive material disposed between said tab and said pouch material adjacent said cut edge in a manner sufficient to prevent contact between said electrode tab and said central metal foil exposed at said cut edge.

* * * * *